Patented Feb. 12, 1935

1,991,139

UNITED STATES PATENT OFFICE 1,991,139

PROCESS OF MAKING CANDY LAXATIVE TABLETS

Katherine A. Clark, Kansas City, Mo.

No Drawing. Application November 14, 1932,
Serial No. 642,599

4 Claims. (Cl. 167—56)

This invention relates to a process of making candy laxative tablets.

Heretofore, considerable difficulty has been encountered in the manufacture of candy laxative compositions, due to the fact that a thorough blend between the laxative and candy could not be uniformly obtained. This was particularly true with compositions containing chocolate and castor oil because chocolate has a tendency to repel the castor oil.

In accordance with the present invention predetermined quantities of broken chocolate cake and castor oil are heated in separate containers or kettles before mixing. The chocolate is heated to approximately 115 degrees F. while being thoroughly stirred or agitated and is then permitted to cool to approximately 85 degrees F., and finally this temperature is slowly increased to between 88 and 90 degrees. After the chocolate melting operation has been commenced or simultaneous with this operation, an amount of castor oil approximating that of the melted chocolate is slowly heated to between 85 and 90 degrees F., preferably between 88 and 90 degrees, and the heating of the castor oil and chocolate is so timed that the temperature of one will coincide with that of the other. The best mixing temperature is between 88 and 90 degrees but excellent blending results can be obtained where the temperatures of the chocolate and castor oil are between 85 and 90 degrees when mixed. It is essential however that the temperature of each be the same. Mixing of the melted chocolate and heated castor oil is effected at this stage by drawing off the two ingredients from their separate kettles into a mixer, not shown, where they are thoroughly beaten and blended and then gradually lowered in temperature to between 75 and 80 degrees F.

The mixture thus obtained constitutes the so called centers of chocolate shells into which the mixture or blend of chocolate is transferred in any suitable manner from the mixer while at a temperature of between 75 and 80 degrees. The shells are then capped with chocolate and run into a cold box, also not shown.

Much experimental work has conclusively proven that where any material variation from the mixing temperatures heretofore mentioned is attempted, it is impossible to obtain the necessary blend. The reason for this is not definitely known, except that the centers take longer to harden under such circumstances, and that when finally hardened invariably have soft spots which cause an unpleasant taste. These soft spots would seem to indicate that where the temperatures of the two ingredients differ one from the other when the ingredients are mixed, that the oil is repugnant to the chocolate and that the latter in effect trys to expel the oil.

Having thus described my invention, what I claim as my invention is:

1. A process of making laxative tablets, consisting in heating melted chocolate and castor oil in separate containers to temperatures of between 85 and 90 degrees F., then mixing these two ingredients in a mixer while maintaining said temperatures, cooling the mixture and enclosing the mixture in edible shells.

2. A process of making laxative tablets, consisting in heating melted chocolate and castor oil in separate containers to temperatures of between 88 and 90 degrees F., then mixing these two ingredients in a mixer while maintaining said temperatures, cooling the mixture and enclosing the mixture in edible shells.

3. A process of making laxative tablets containing chocolate and castor oil, which includes separately heating melted chocolate and castor oil to temperatures of between 85 and 90 degrees F., then placing these two ingredients in a mixing container while at said temperatures, subjecting them to a beating and blending treatment, cooling the mixture, enclosing the mixture in chocolate shells and then cooling and capping the filled shells.

4. A process of making laxative tablets containing chocolate and castor oil, which includes heating chocolate to approximately 115 degrees F., cooling the chocolate to approximately 85 degrees F., then heating the chocolate and castor oil separately to temperatures of between 85 and 90 degrees F., then placing these two ingredients in a mixing container while at said temperatures last mentioned, subjecting them to a beating and blending treatment, cooling the mixture, enclosing the mixture in chocolate shells and then cooling and capping the filled shells.

KATHERINE A. CLARK.